US010328985B2

(12) United States Patent
Saito et al.

(10) Patent No.: US 10,328,985 B2
(45) Date of Patent: Jun. 25, 2019

(54) FUEL TANK FOR SADDLED VEHICLE

(71) Applicant: HONDA MOTOR CO., LTD., Tokyo (JP)

(72) Inventors: Yusuke Saito, Wako (JP); Masanori Usa, Wako (JP)

(73) Assignee: HONDA MOTORS CO., LTD., Tokyo (JP)

( * ) Notice: Subject to any disclaimer, the term of this patent is extended or adjusted under 35 U.S.C. 154(b) by 0 days.

(21) Appl. No.: 15/717,104

(22) Filed: Sep. 27, 2017

(65) Prior Publication Data

US 2018/0093733 A1 Apr. 5, 2018

(30) Foreign Application Priority Data

Sep. 30, 2016 (JP) .................. 2016-194439

(51) Int. Cl.
B60K 15/03 (2006.01)
B60K 15/04 (2006.01)
(Continued)

(52) U.S. Cl.
CPC ........... B62J 35/00 (2013.01); B60K 15/0406 (2013.01); B60K 15/05 (2013.01);
(Continued)

(58) Field of Classification Search
CPC ....... B62J 35/00; B62J 37/00; B60K 15/0406; B60K 15/05; B60K 2015/03032;
(Continued)

(56) References Cited

U.S. PATENT DOCUMENTS 5,261,700 A * 11/1993 Martenas ............... B60K 15/04
141/86
2015/0090512 A1* 4/2015 Inoue ..................... B62J 35/00
180/219
(Continued)

FOREIGN PATENT DOCUMENTS

CN 102072052 A 5/2011
JP S6274782 A 4/1987
(Continued)

OTHER PUBLICATIONS

JPH0924874A Translation, Miyannoto et al., Jan. 1997, p. 1-19.*
(Continued)

Primary Examiner — J. Gregory Pickett
Assistant Examiner — Matusala K Tewolde
(74) Attorney, Agent, or Firm — Squire Patton Boggs (US) LLP

(57) ABSTRACT

A fuel cap is constituted to close an upper portion of a tubular member constituting a filler opening of a fuel tank, and wherein the breather mechanism is constituted to discharge vaporized fuel separated by gas-liquid separation in a labyrinth path within the fuel cap through a breather drain hose supported at a side of the fuel tank, the fuel tank further comprising: a plate member fixed to a support member to support the fuel cap to the fuel tank; and a seal member to airtightly communicate an exit of the labyrinth path and an end portion of the breather drain hose when the fuel cap is closed. The breather drain hose connected to a lower side of the seal member is supported by the plate member.

13 Claims, 10 Drawing Sheets

(51) Int. Cl.
*B60K 15/05* (2006.01)
*B62J 35/00* (2006.01)
*B60K 15/035* (2006.01)

(52) U.S. Cl.
CPC ............... *B60K 2015/03032* (2013.01); *B60K 2015/03509* (2013.01); *B60K 2015/03523* (2013.01); *B60K 2015/03547* (2013.01); *B60K 2015/0445* (2013.01); *B60K 2015/0451* (2013.01); *B60Y 2200/12* (2013.01)

(58) Field of Classification Search
CPC ........... B60K 2015/03509; B60K 2015/03547; B60K 2015/0445; B60K 2015/0451; B60Y 2200/12; B62K 19/02; B62K 19/30
USPC ........ 220/562, 361, 366.1, 86.1, 367.1, 368, 220/369, 370, 371, 372, 373, 374, 86.2
See application file for complete search history.

(56) References Cited

U.S. PATENT DOCUMENTS

2015/0258888 A1* 9/2015 Kunisada ................. B62J 35/00
                                                                  220/562
2016/0280301 A1* 9/2016 Inoue ...................... B62J 35/00

FOREIGN PATENT DOCUMENTS

| JP | H0924874 A | * | 1/1997 | ............. B60K 15/04 |
| JP | H0924874 A | | 1/1997 | |
| JP | 2013-043529 A | | 3/2013 | |

OTHER PUBLICATIONS

Feb. 13, 2018 Search Report issued in Extended European Patent Application No. 17193254.4.
Japanese Office Action Notification of Reasons for Refusal corresponding Japanese application No. 2016-194439 dated Aug. 1, 2018.

* cited by examiner

FUEL TANK FOR SADDLED VEHICLE

CROSS-REFERENCE TO RELATED APPLICATIONS

The present application claims priority under 35 USC 119 to Japanese Patent Application No. 2016-194439 filed Sep. 30, 2016 the entire contents of which are hereby expressly incorporated by reference.

TECHNICAL FIELD

The present invention relates to a fuel tank for a saddled vehicle, in particular to a fuel tank for a saddled vehicle with a breather mechanism to discharge vaporized fuel occurring within the tank.

BACKGROUND ART

Conventionally, it is well-known that a breather mechanism is used to discharge fuel vaporized by a rise in temperature or the like out of a fuel tank so that pressure in the fuel tank does not so rise.

In Patent Literature 1, it is disclosed a breather mechanism in which a stay is provided at a bottom surface of an overflow tray receiving fuel spilled outside of a filler opening. A gas-liquid separation device with a breather hose is fixed to the stay.

CITATION LIST

Patent Literature

Patent Document 1: JP 2013-043529 A

SUMMARY OF INVENTION

Technical Problem

However, in the breather mechanism disclosed in Patent Literature 1, it is necessary to weld the stay for fixing the gas-liquid separation device to the bottom surface of the overflow tray, therefore there is a problem that the number of parts and weight increases and welding process to the fuel tank increases.

It is an object of the present invention to solve the problems of the conventional technology and provide a fuel tank for a saddled vehicle capable of possessing a breather mechanism while restraining the number of parts, weight, and welding process number.

Solution to Problems

To achieve the aforementioned object, the present invention has a first feature in that a fuel tank (40) for a saddled vehicle comprising a fuel cap (60) of an opening and closing type incorporating a breather mechanism, wherein the fuel cap (60) is constituted to close an upper portion of a tubular member (47) constituting a filler opening of the fuel tank (40), the breather mechanism is constituted to discharge vaporized fuel separated by gas-liquid separation in a labyrinth path (67) within the fuel cap (60) through a breather drain hose (61) supported at a side of the fuel tank (40), the fuel tank (40) further includes: a plate member (69) provided on an upper surface of the fuel tank (40) and fixed to a support member (80) to support the fuel cap (60) to the fuel tank (40); and a seal member (64) to airtightly communicate an exit (67a) of the labyrinth path (67) and an end portion of the breather drain hose (61) when the fuel cap (60) is closed, and the breather drain hose (61) connected to a lower side of the seal member (64) is supported by the plate member (69).

The present invention has a second feature in that the support member (80) is constituted so that at least one pedestal portion (81) is attached on an upper surface of an annular base plate (83), the pedestal portion (81) having two leg portions (81a) formed by folding a plate member into a substantially U-shape, and the breather drain hose (61) is locked to a guide portion (69d) formed in the plate member (69) at a position overlapping with the support member (80) as seen in a plan view of the vehicle.

The present invention has a third feature in that the at least one pedestal portion (81) includes three pedestal portions (81), the fuel cap (60) is fixed by utilizing a fastening portion (82) formed in each of the pedestal portions (81), and the seal member (64) is positioned on a straight line (L) connecting two fastening portions (82) in a plan view of the vehicle.

The present invention has a fourth feature in that the fuel tank for the saddled vehicle comprising an overflow tray (70) receiving fuel spilled outside of the tubular member (47), wherein the overflow tray (70) is fastened and fixed together with the fuel cap (60) and the support member (80) while being put on an upper surface of the plate member (69).

The present invention has a fifth feature in that an annular recess portion (44) surrounding the tubular member (47) is formed on an upper surface of the fuel tank (40), and the support member (80) is welded and fixed to the annular recess portion (44).

The present invention has a sixth feature in that the fuel tank (40) is formed by connecting an upper member (42) and a lower member (43), both being formed by press molding, the upper member (42) is formed in a solid body shape constituting an upper portion, a side portion and a rear portion of the fuel tank (40) while increasing a size in the front and rear direction as going to a lower direction of the vehicle as seen in the side view of the vehicle, and the lower member (43) is formed in a shape constituting the front portion and the bottom portion of the fuel tank (40) by curving a flat plate.

The present invention has a seventh feature in that the fuel tank (40) and the support member (80) are formed of a titanium material.

The present invention has an eighth feature in that the fuel tank for the saddled vehicle comprising a tank cover (26) covering the fuel tank (40) from an upper surface thereof; wherein at least a part of the plate member (69) is protruded outward of a circumference of the overflow tray (70) receiving fuel spilled outside of the tubular member (47) and the protruded part restrains movement of the tank cover (26) to a lower direction of the vehicle.

The present invention has a ninth feature in that a folding portion (69a) is formed in the plate member (69), the folding portion (69a) being parallel with a straight line (L) connecting two fastening portions (82) and overlapping with the seal member (64).

Advantageous Effects of Invention

According to the first feature, the fuel cap (60) is constituted to close an upper portion of a tubular member (47) constituting a filler opening of the fuel tank (40), the breather mechanism is constituted to discharge vaporized fuel separated by gas-liquid separation in a labyrinth path (67) within the fuel cap (60) through a breather drain hose (61) supported at a side of the fuel tank (40), the fuel tank (40) further includes: a plate member (69) provided on an upper surface of the fuel tank (40) and fixed to a support member (80) to support the fuel cap (60) to the fuel tank (40); and a seal member (64) to airtightly communicate an exit (67a) of the labyrinth path (67) and an end portion of the breather drain hose (61) when the fuel cap (60) is closed, and the breather drain hose (61) connected to a lower side of the seal member (64) is supported by the plate member (69). Therefore, the breather drain hose is supported by a plate-like member fixed to a supporting member of a fuel cap, thereby exclusive parts to support the breather drain hose or welding process of the exclusive parts can be eliminated, and production cost and weight can be restrained.

According to the second feature, the support member (80) is constituted so that at least one pedestal portion (81) is attached on an upper surface of an annular base plate (83), the pedestal portion (81) having two leg portions (81a) formed by folding a plate member into a substantially U-shape, and the breather drain hose (61) is locked to a guide portion (69d) formed in the plate member (69) at a position overlapping with the support member (80) as seen in a plan view of the vehicle. Therefore, without providing an exclusive stay and the like, the breather drain hose can be easily supported by the plate-like member fixed to a pedestal of the fuel cap. Further, by restraining the position of the breather drain hose at a position near a seal member, tolerance for swing due to vibration can be raised.

According to the third feature, the at least one pedestal portion (81) includes three pedestal portions (81), the fuel cap (60) is fixed by utilizing a fastening portion (82) formed in each of the pedestal portions (81), and the seal member (64) is positioned on a straight line (L) connecting two fastening portions (82) in a plan view of the vehicle. Therefore, positioning of the breather drain hose can be easily conducted. Concretely, one pedestal is arranged at the front side of the vehicle and two pedestals are arranged at the rear side of the vehicle, further the drain hose is arranged at the center in the width direction of the vehicle in the rear side thereof. Thereby, in a case that the openable fuel cap having a hinge portion at the rear side of the vehicle is adopted, fastening rigidity of the fuel cap can be raised at the position near the hinge portion and the exit of a labyrinth path and the seal member can be precisely contacted each other at the position near the hinge portion.

According to the fourth feature, an overflow tray (70) receiving fuel spilled outside of the tubular member (47) is comprised, wherein the overflow tray (70) is fastened and fixed together with the fuel cap (60) and the support member (80) while being put on an upper surface of the plate member (69). Therefore, without adding the exclusive stay and welding process of the exclusive stay, both the overflow tray and the plate-like member can be fixed to the fuel tank.

According to the fifth feature, an annular recess portion (44) surrounding the tubular member (47) is formed on an upper surface of the fuel tank (40), and the support member (80) is welded and fixed to the annular recess portion (44). Therefore, strength of the fuel tank can be raised by a circular recess portion and it can be restrained that the supporting member is protruded to the upward direction of the vehicle.

According to the sixth feature, the fuel tank (40) is formed by connecting an upper member (42) and a lower member (43), both being formed by press molding, the upper member (42) is formed in a solid body shape constituting an upper portion, a side portion and a rear portion of the fuel tank (40) while increasing a size in the front and rear direction as going to a lower direction of the vehicle as seen in the side view of the vehicle, and the lower member (43) is formed in a shape constituting the front portion and the bottom portion of the fuel tank (40) by curving a flat plate. Therefore, the center of gravity of the fuel tank can be lowered and fuel capacity can be increased. Further, rigidity is raised by forming a lower side member in a substantially plane shape, thereby thinning thickness of the plate member can be conducted.

According to the seventh feature, the fuel tank (40) and the support member (80) are formed of a titanium material. Therefore, the fuel tank can be made lightweight and high rigidity. Further, since the fuel tank and the supporting member are made of the same material, both can be connected by general seam welding and spot welding.

According to the eighth feature, a tank cover (26) covering the fuel tank (40) from an upper surface thereof is comprised; wherein at least a part of the plate member (69) is protruded outward of a circumference of the overflow tray (70) receiving fuel spilled outside of the tubular member (47) and the protruded part restrains movement of the tank cover (26) to a lower direction of the vehicle. Therefore, when a tank cover is assembled, movement to the downward direction of the tank cover is retrained, thereby positioning of the tank cover can be easily done and the tank cover can be stably fixed.

According to the ninth feature, a folding portion (69a) is formed in the plate member (69), the folding portion (69a) being parallel with a straight line (L) connecting two fastening portions (82) and overlapping with the seal member (64). Therefore, by raising rigidity of the plate-like member at the portion supporting the seal member, suitable seal property can be obtained.

DESCRIPTION OF EMBODIMENTS

Figure 1:
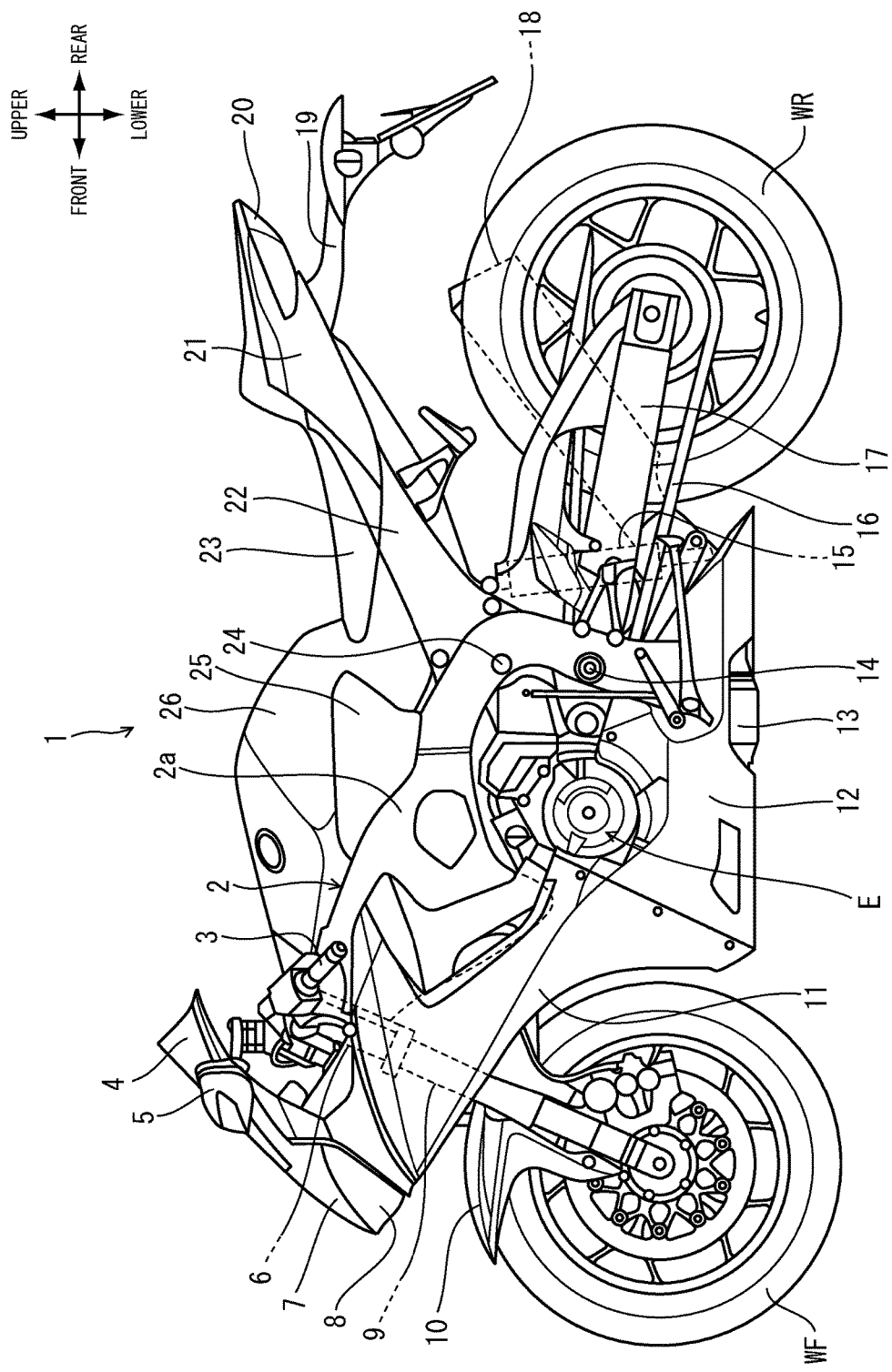
FIG. 1 is a left side view of a motorcycle to which a fuel tank for a saddled vehicle according to the present embodiment is adopted.
Figure 2:
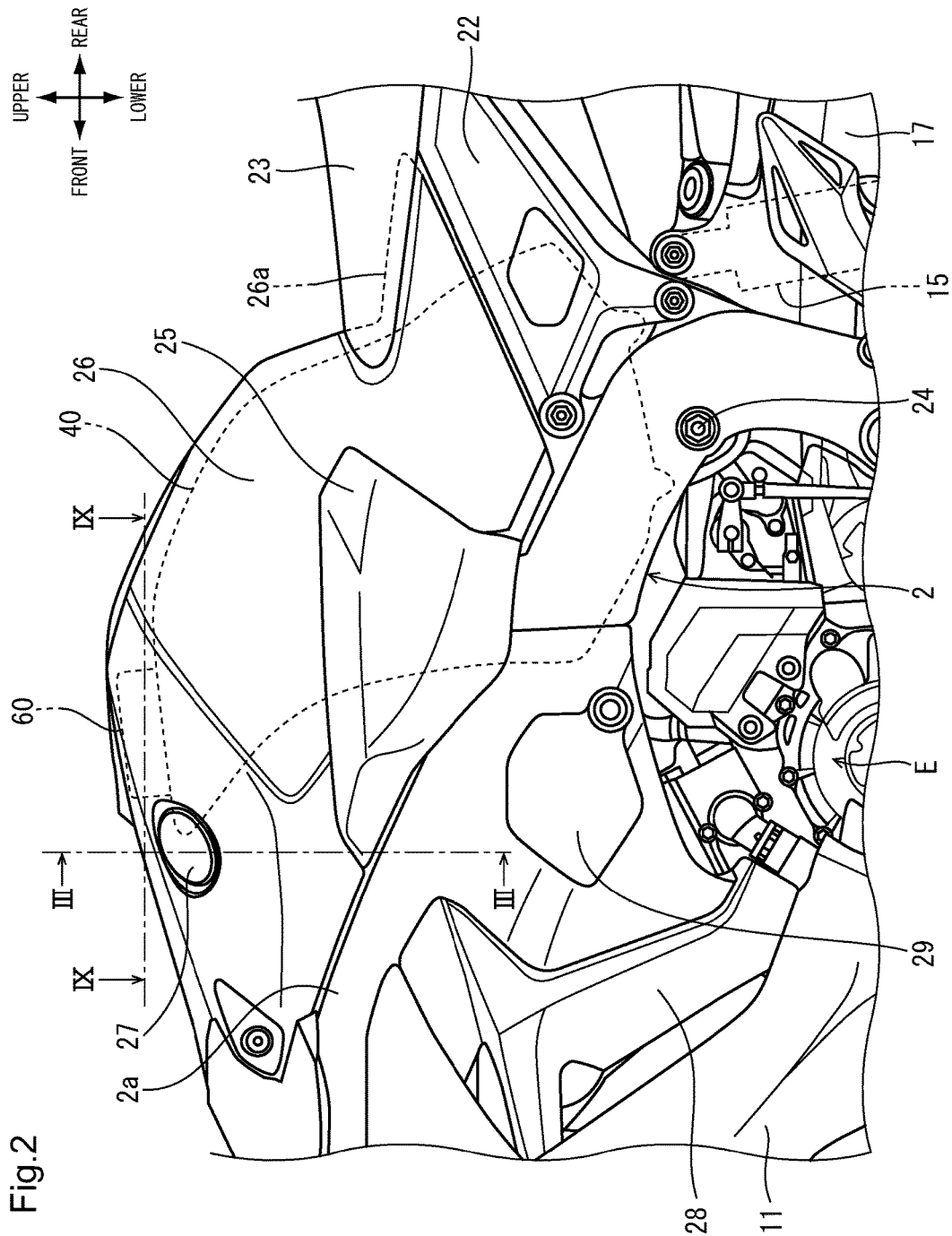
FIG. 2 is a partially enlarged view of FIG. 1.

Hereinafter, preferred embodiments of the present invention will be described in detail with reference to the drawings. FIG. 1 is a left side view of a motorcycle 1 to which a fuel tank 40 for a saddled vehicle according to the present embodiment is adopted. FIG. 2 is a partially enlarged view of FIG. 1. The motor cycle 1 is the saddled vehicle in which the fuel tank 40 is arranged between a steering handlebar 3 for steering a front wheel WF and a seat 23 on which an occupant sits. The fuel tank 40 is extended downward to a position where a main frame 2a constituting a body frame 2 is overlapped with the fuel tank and an upper side portion of the fuel tank 40 is covered by a tank cover 26 as exterior parts made of a synthetic resin and the like. The tank cover 26 has a form to integrally cover the fuel tank 40 and an air cleaner box 30 positioned at a front position of the cleaner box. One pair of right and left knee grip pads 25 are attached so as to step over a border of the tank cover 26 and the main frame 2a.

One pair of right and left front forks 9 are pivotally supported to a head pipe 6 formed to a front end of the main frame 2a in a swingable manner. The steering handlebar 3 is fixed to upper end portions of the front forks 9 and the front wheel WF is rotatably supported to lower ends of the front forks 9. To a position of middle section of the front fork 9, it is attached a front fender 10 covering an upper portion of the front wheel WF.

To a rear lower portion of the main frame 2a, it is provided a pivot 14 which pivotally supports a front end portion of a swing arm 17 rotatably supporting a rear wheel WR. The swing arm 17 is supported to the main frame 2a by a rear cushion 15 positioned at the rear of the pivot 14. At the upper of the pivot 14, a mount shaft 24 for suspending a rear upper portion of an engine E is arranged. Driving force of the engine E is transmitted to the rear wheel WR through a drive chain 16 and combustion gas of the engine E is exhausted from a muffler 18 through an exhaust pipe 13.

A front portion of the steering handlebar 3 is covered by a front cowl 7 in which a headlight 8 is buried. At an upper portion of the cowl 7, a colorless transparent or colored transparent windshield screen 4 and a rearview mirror 5 in which a front blinker device is integrally formed are attached. One pair of right and left side cowls 11 continuing to a lower portion of the front cowl 7 are formed in a shape to cover from a side of the front fork 9 to a lower portion of the engine E.

To a rear frame 22 fixed to an upper rear end portion of the main frame 2a, the seat 23 and a seat cowl 21 are supported. To a rear portion of the seat cowl 21, a taillight device 20 is attached, and under the taillight device 20, it is attached a rear fender 19 serving as a support stay of a rear blinker device.

Referring to FIG. 2, to an upper front portion of the tank cover 26, one pair of right and left circular emblems 27 are attached and a fuel cap 60 of the fuel tank 40 is arranged at a center of the vehicle width direction behind the emblems 27. An upper side portion of the fuel tank 40 is put in a position of rear side of the tank cover 26 and one lower side of the fuel tank 40 extends toward a lower of the vehicle. To a rear end portion of the tank cover 26, it is formed a rear extending portion 26a put in a lower portion of the seat 23. To a rear portion of the side cowl 11, one pair of right and left rectification covers 28 are arranged and to the main frame 2a, it is attached a cover member 29 blocking up a through-hole for adjusting a rigidity balance.

Figure 3:
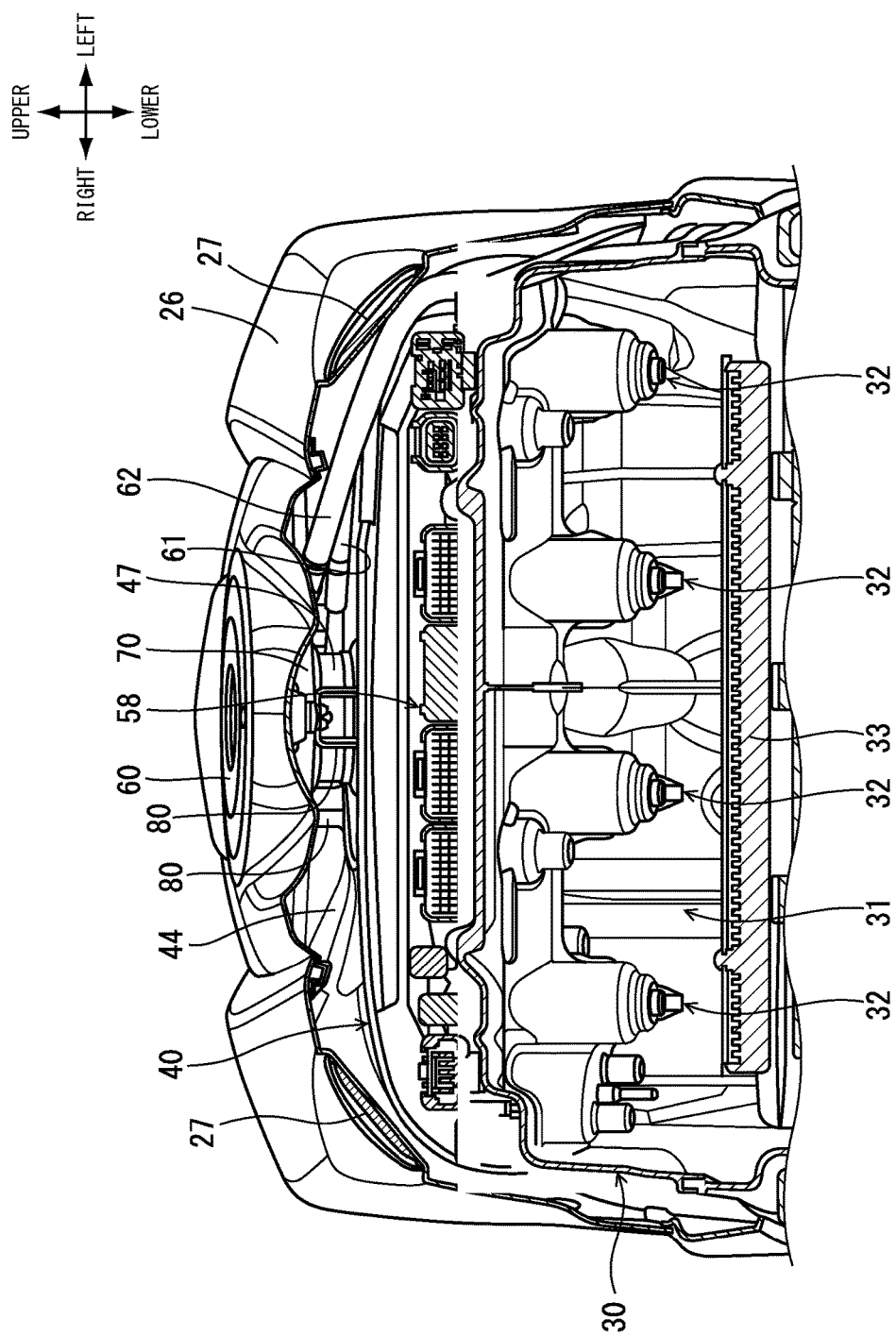
FIG. 3 is a sectional view sectioned along line in FIG. 2.

FIG. 3 is a sectional view sectioned along line in FIG. 2. The fuel cap 60 is exposed upward from an opening in the center of vehicle width direction of the tank cover 26. Under the fuel cap 60, it is fixed a tubular member 47 constituting a filler opening to fit within an opening formed on an upper surface of the fuel tank 40 and an overflow tray 70 to receive fuel not poured into the tubular member 47.

The fuel cap 60 is supported to the fuel tank 40 via a support member 80 fixed to an annular recess portion 44 formed so as to surround the filler opening of the fuel tank 40. By the annular recess portion 44, strength of the fuel tank 40 can be raised, and based on that the support member 80 is put in the annular recess portion 44, it can be restrained a protrusion amount of the support member 80 toward the upper direction of the vehicle.

At the left position in the vehicle width direction between the tank cover 26 and the annular recess portion 44, it is piped an overflow drain hose 62 to discharge fuel received by the overflow tray 70 to the lower direction of the vehicle and a breather drain hose 61 to discharge vaporized fuel extracted by the breather mechanism incorporated in the fuel cap 60 to the lower direction of the vehicle.

In the air cleaner box 30 arranged in front of the vehicle of the fuel tank 40, a dry air filter 33 and injectors 32 injecting fuel from the upper of an intake funnel of the engine E are arranged. At the upper portion of the air cleaner box 30, a plurality of connectors 58a connected with an ECU 58 (see FIG. 5) are arranged.

Figure 4:
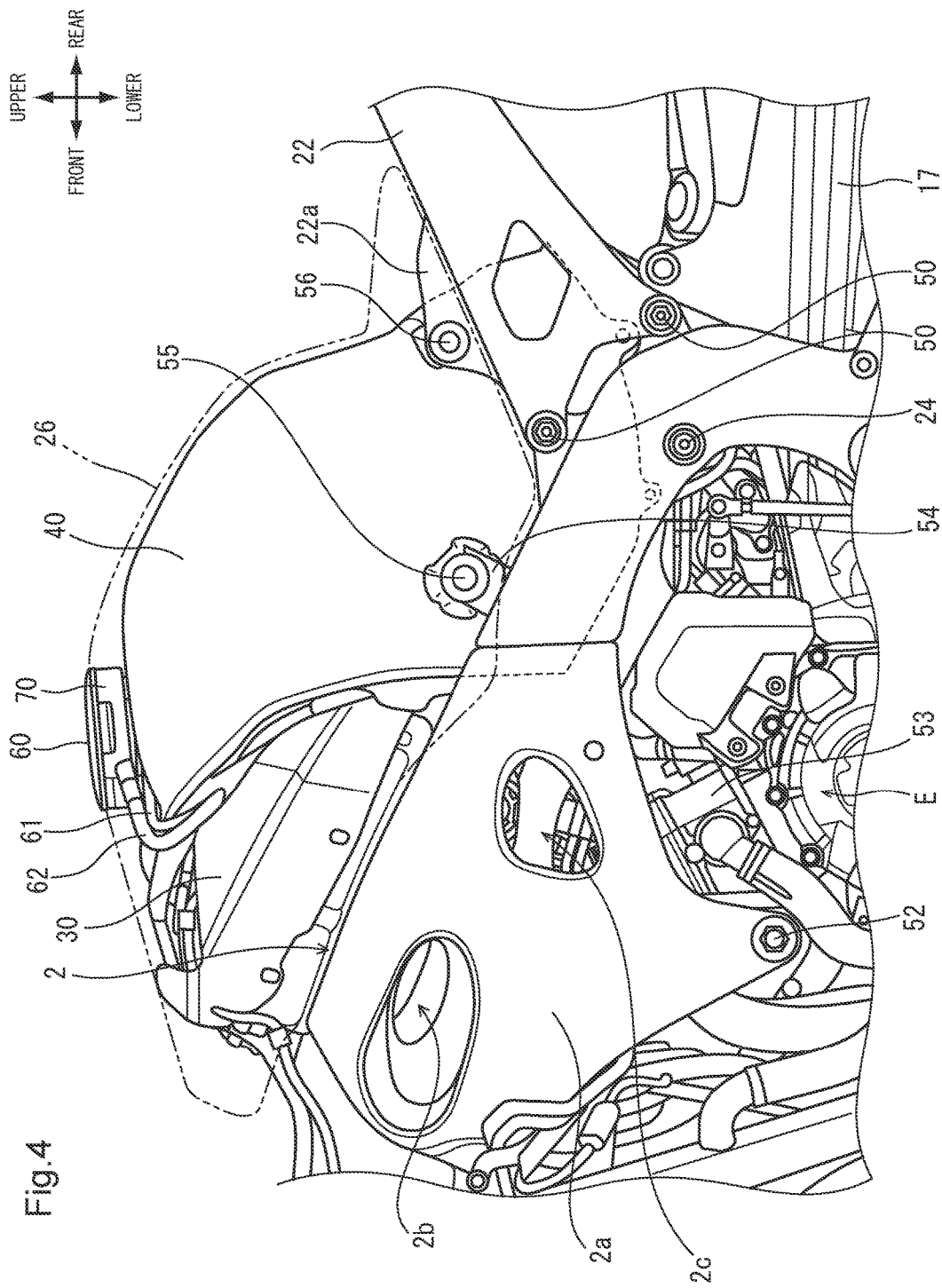
FIG. 4 is a left side view showing a state that exterior parts such as a tank cover are removed from a state shown in FIG. 2.

FIG. 4 is a left side view showing a state that exterior parts such as the tank cover 26 are removed from a state shown in FIG. 2. The fuel tank 40 is placed adjacent so as to cover a rear plane of the air cleaner box 30. Both a breather drain hose 61 and the overflow drain hose 62 are piped at the lower of the vehicle while passing through a gap of the air cleaner box 30 and fuel tank 40.

At an upper portion of the main frame 2a, there are formed one pair of right and left front stays 54 to support the fuel tank 40. Further, to the rear frame 22 fixed to the rear upper portion of the main frame 2a by fastening members 50, one pair of right and left rear stays 22a are arranged. The fuel tank 40 is fixed to the body frame 2 side at four points by fastening members 55, 56 penetrating the front stays 54 and the rear stays 22a.

At front side positions of the main frame 2a, there are formed one pair of right and left through-holes 2b in each of which a duct (not shown) to introduce fresh air from the front of the vehicle in the air cleaner box 30 is fit. At the rear position of the through-hole 2b, a through-hole 2c covered by the cover member 29 (see FIG. 2) is formed. A mount shaft 52 directed in the vehicle width direction under the through-hole 2c supports the engine E at the front position of a cylinder 53.

Figure 5:
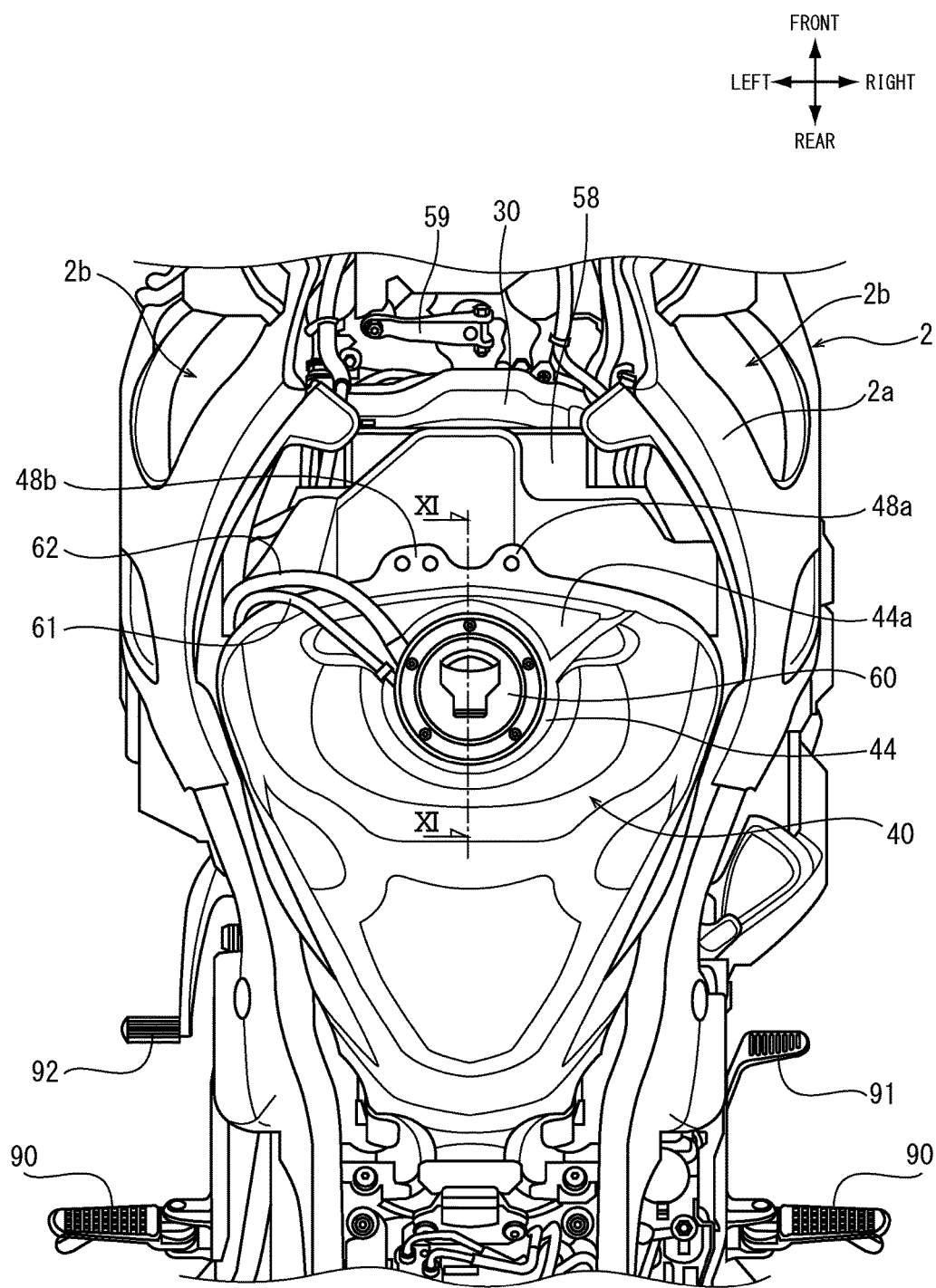
FIG. 5 is a partially enlarged plan view of the motorcycle.

FIG. 5 is a partially enlarged plan view of the motorcycle 1. In this FIG. 5, it is shown a state that the tank cover 26 and the like are removed. At the front of the air cleaner box 30, it is arranged an arm member 59 transmitting damping force of a steering damper of electronic control type to the steering handlebar 3. Between the front end portion of the fuel tank 40 and the air cleaner box 30, the ECU 58 as an engine control device is arranged.

A width of the fuel tank 40 in the vehicle width direction is formed so as to become the maximum at the front side of the body along a shape of the main frame 2a and to become smaller as going to the rear of the vehicle. At the front end portion of the fuel tank 40, extending portions 48a, 48b to support auxiliary devices are formed.

To the front of the annular recess portion 44 to which the fuel cap 60 is attached, a front recess portion 44a widened toward the front of the vehicle continues. The breather drain hose 61 and the overflow drain hose 62 are piped to the left front side while being guided by the left periphery of the front recess portion 44a.

To the rear lower end of the main frame 2a, footrest steps 90 for an occupant are arranged. At the front of the right footrest step 90, a brake pedal 91 is arranged and a shift pedal 92 is arranged at the left side.

Figure 6:
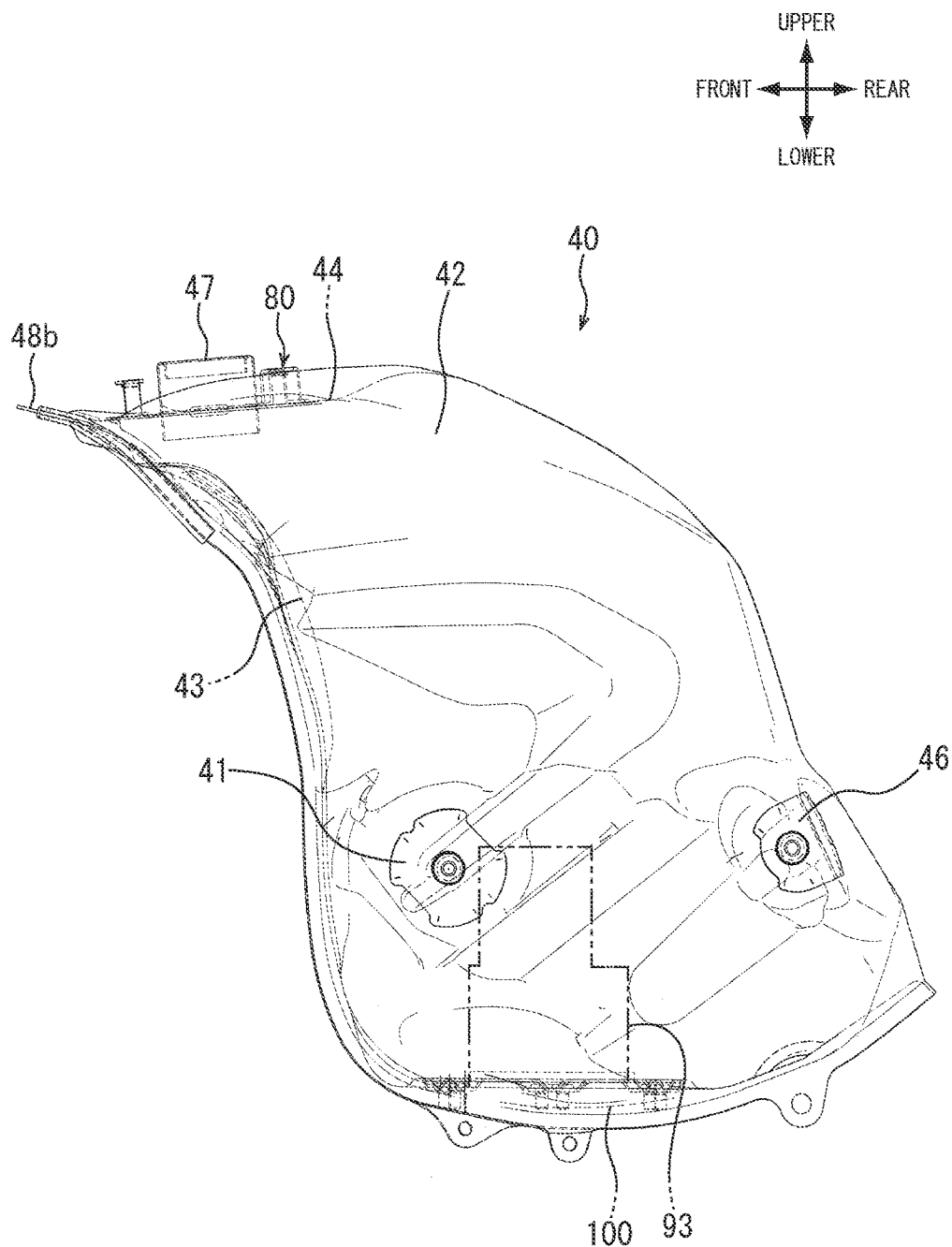
FIG. 6 is a left side view of the fuel tank.

FIG. 6 is a left side view of the fuel tank 40. The fuel tank 40 according to the present embodiment is formed by connecting an upper member 42 and a lower member 43, both being obtained by press molding of a titanium material. As for the thickness of the titanium material, for example, 0.7 mm is the optimum value and each portion thereof can be set to a thickness of a range within 0.5-0.9 mm.

The upper member 42 is formed in a solid body shape (three-dimensional shape) constituting an upper portion, a side portion and a rear portion of the fuel tank 40 while increasing a size in front and rear direction as going to the lower of the body as seen in the side view of the vehicle. Meanwhile, the lower member 43 constitutes the front portion and the bottom portion of the fuel tank 40 by two-dimensional shape obtained by curving a flat plate.

According to the above constitution, center of gravity of the fuel tank 40 can be lowered and fuel capacity can be increased. Further, since the lower member 43 is formed in a substantially plane shape, rigidity thereof can be raised; therefore, thinning of thickness in the plate member can be conducted. The lower member 43 constitutes the bottom portion which is gently curved toward the lower portion from the front portion of the fuel tank 40 and which is strongly curved toward the rear side of the vehicle at the lowest portion and which directs substantially horizontally. To this bottom portion, a support plate 100 supporting a fuel pump 93 is attached.

As mentioned in the above, the tubular member 47 constituting the filler opening is fit in the opening formed in the annular recess portion 44 and is fixed by seam welding. The support member 80 supporting the fuel cap 60 is fixed by spot welding around the tubular member 47. To the side plane of the upper member 42, support stays 41, 46 to which the fastening members 55, 56 to support the fuel tank 40 to the body frame 2 side are screwed, are fixed by seam welding.

Figure 7:
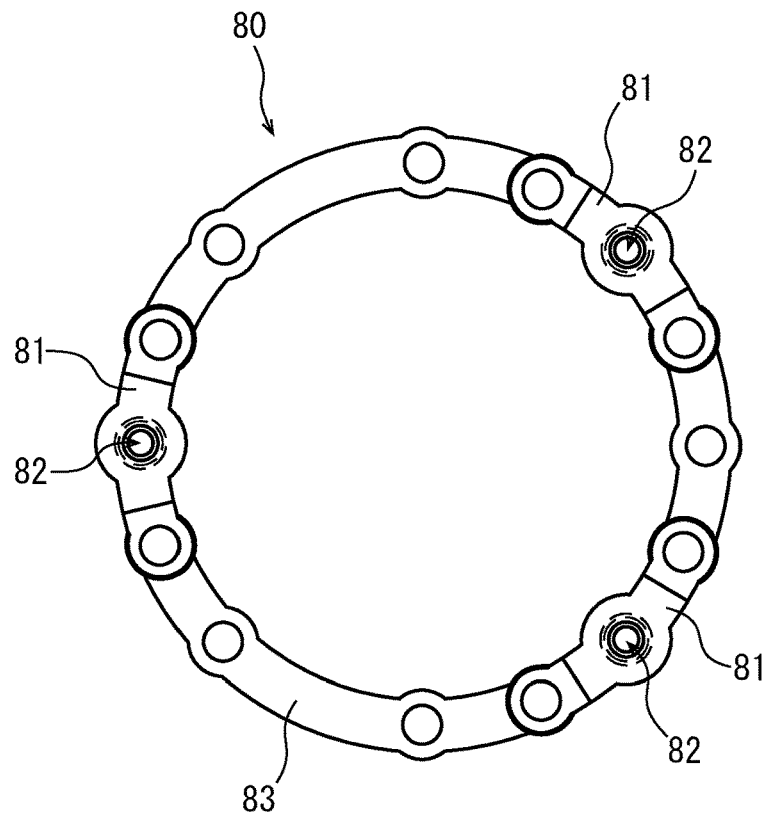
FIG. 7 is a plan view of a support member.
Figure 8:
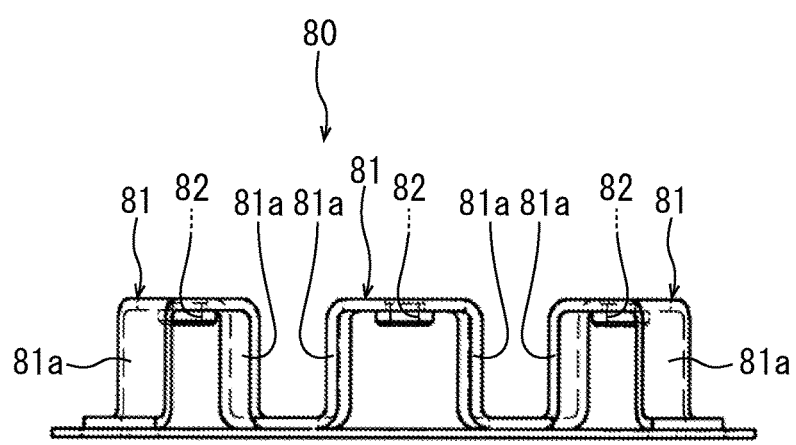
FIG. 8 is a front view of the support member.

FIG. 7 is a plan view of the support member 80. Further, FIG. 8 is a front view of the support member 80. The support member 80 formed of the titanium material is constituted from an annular base plate 83 and three pedestal portions 81. The pedestal portion 81 is formed in a constitution having two leg portions 81a formed by folding the titanium material in a substantial U-shape. Lower ends of the leg portion 81a is fixed on the upper surface of the base plate 83 by welding. The support member 80 is fixed to the fuel tank 40 by welding and fixing the base plate 83 to the annular recess portion 44.

On a ceiling portion of the pedestal portion 81, it is formed a fastening portion 82 as an internal thread portion in which a long bolt 94 (see FIG. 11) to fasten and fix the fuel cap 60 and the overflow tray 70 together is screwed. The three pedestal portions 81 are arranged at unequal spacing and a distance between two points of the rear side of the vehicle is set so as to become slightly small against one point of front side of the vehicle. As for thickness of titanium material, for example, the base plate 83 can be set to 1.2 mm and the pedestal portion 81 can be set to 1.6 mm.

Figure 9:
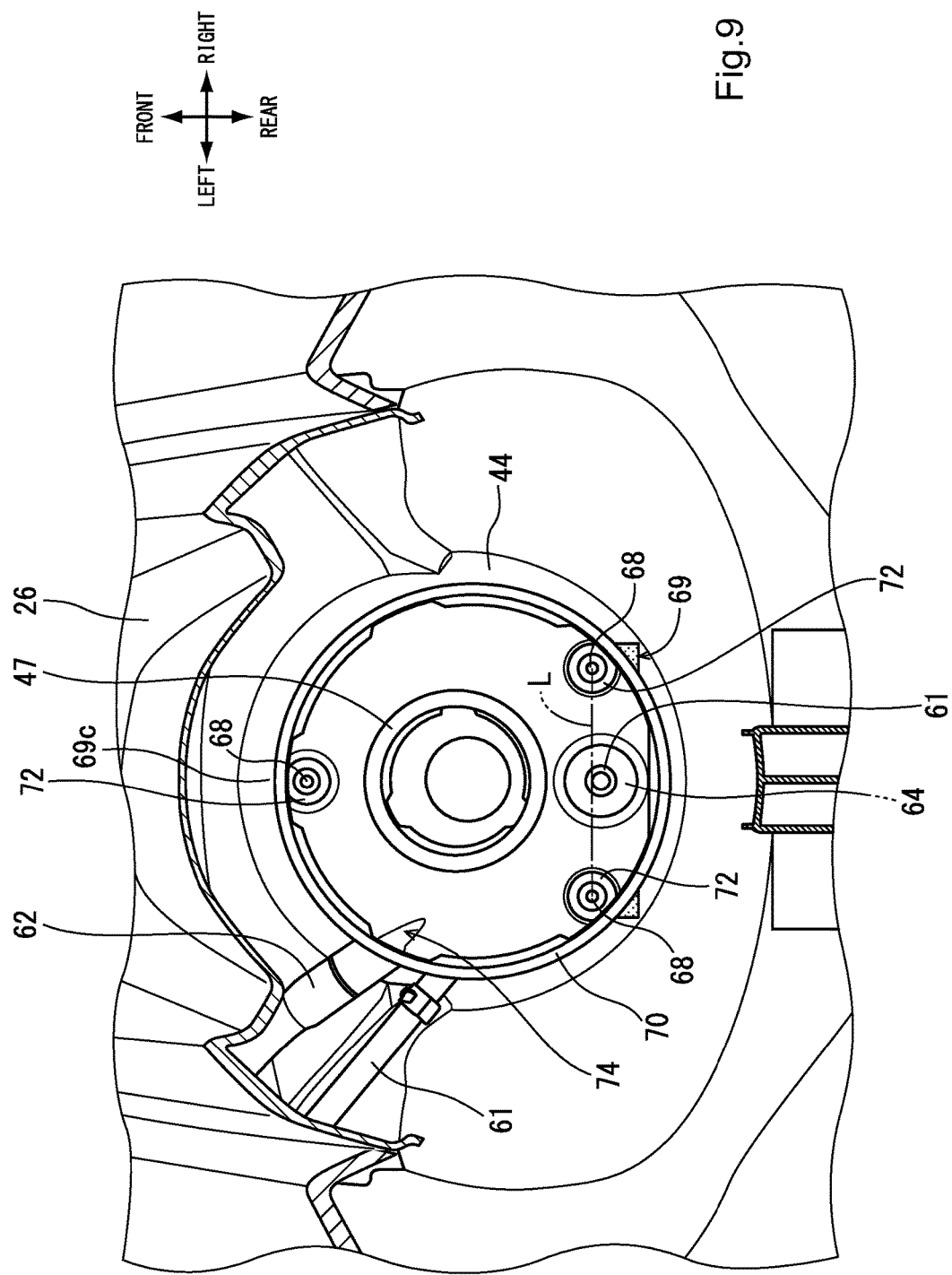
FIG. 9 is a sectional view sectioned along IX-IX line in FIG. 2.
Figure 10:
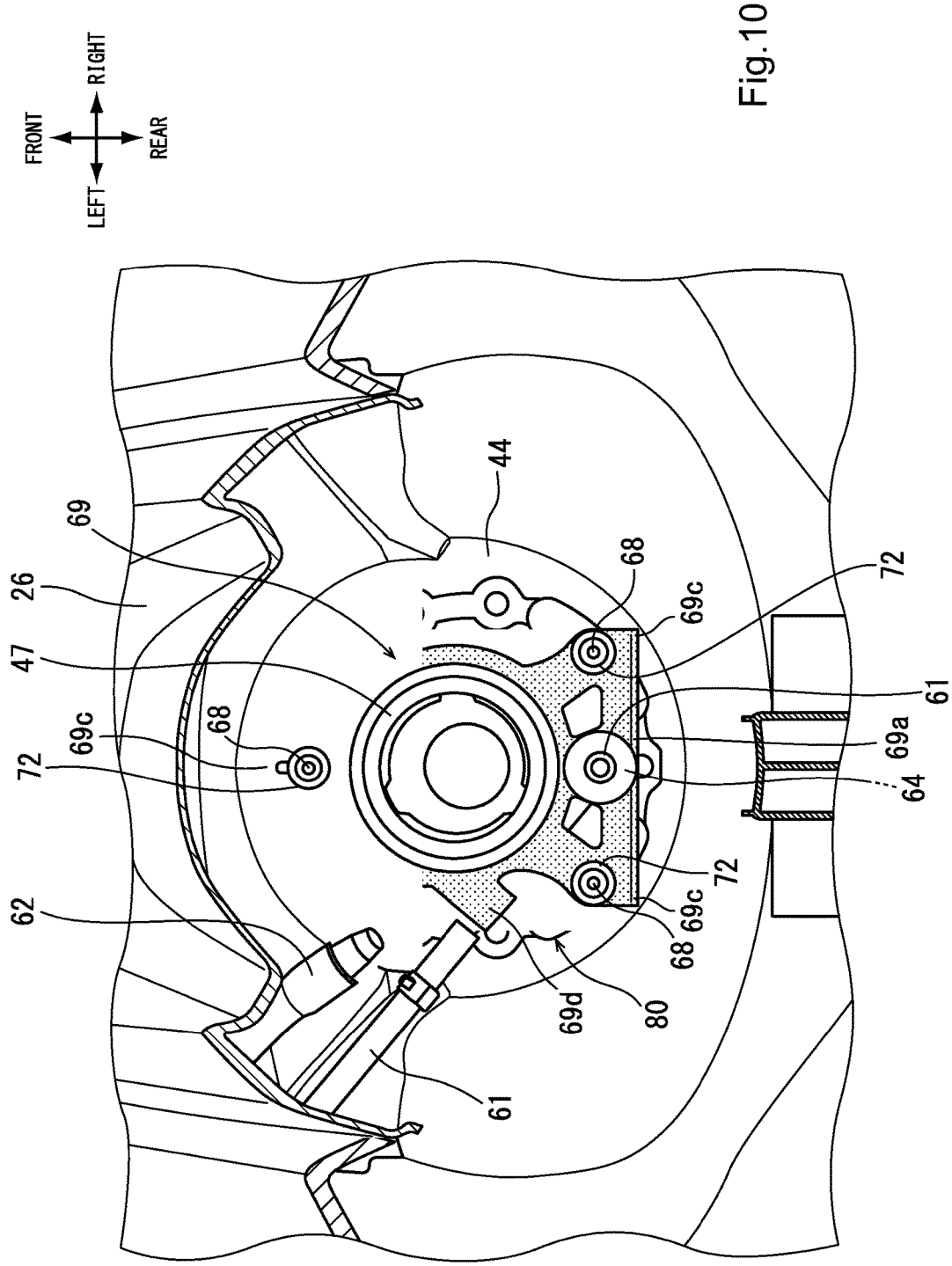
FIG. 10 is a plan view showing a state that an overflow tray is removed from FIG. 9.
Figure 11:
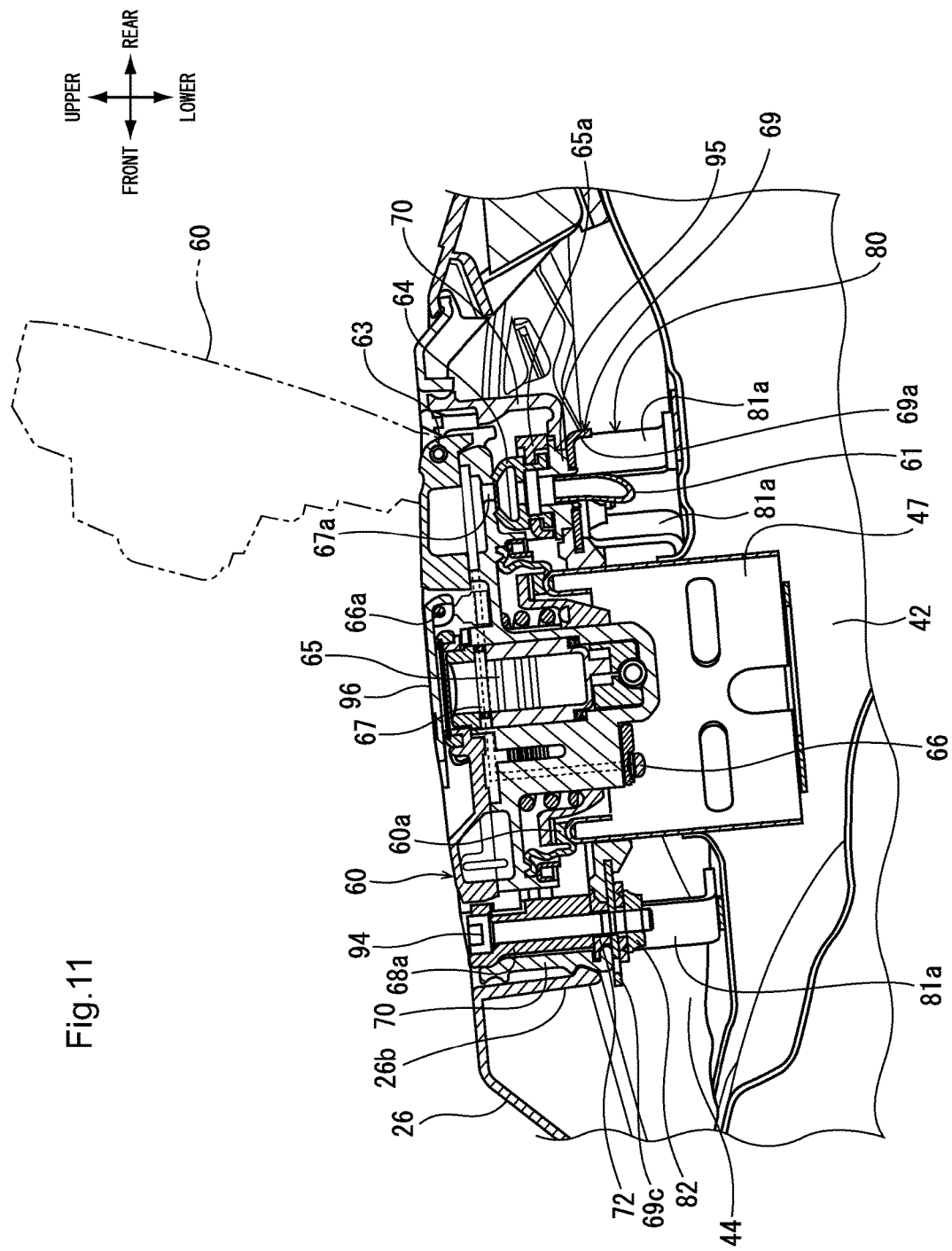
FIG. 11 is a sectional view sectioned along XI-XI line in FIG. 5.

FIG. 9 is a sectional view sectioned along IX-IX line in FIG. 2. Further, FIG. 10 is a plan view showing a state that the overflow tray 70 is removed from FIG. 9, and FIG. 11 is a sectional view sectioned along XI-XI line in FIG. 5. In FIG. 9, it is shown a state that the bottom surface of the overflow tray 70 can be seen in outside of the section of the fuel cap 60 in closing state. Fuel received by the overflow tray 70 is discharged from a drain hole 74 at the left side in the vehicle width direction.

As mentioned in the above, the overflow tray 70 formed by a synthetic resin is fastened and fixed together with the fuel cap 60 by utilizing the long bolt 68 against the pedestal portion 81 in the support member 80 formed of a titanium material. In more detail, to the bottom portion of the overflow tray 70 corresponding to a portion where the long bolt 68 is penetrated, a stepped metallic collar 72 is engaged and this stepped collar 72 is pressed by a collar member 68a (see FIG. 11) in which the long bolt 68 penetrates, thereby the overflow tray 70 is stably supported for the pedestal portion 81. Thus, the overflow tray 70 can be fixed to the fuel tank 40 without adding the exclusive stay or welding process of the exclusive stay.

The end portion of the breather drain hose 61 discharging vaporized fuel extracted in the breather mechanism arranged in the fuel cap 60 is positioned at the center in the vehicle width direction of rear side of the vehicle. This position exists substantially at a center of the straight line L connecting the fastening portions 82 of two pedestal portions 81 in the rear side of the vehicle. Further, to the end portion of the breather drain hose 61 in the upper of the vehicle, a seal member 64 contacting with an exit of the breather mechanism is connected.

Referring to FIG. 10, on the upper surface of the pedestal portion 81 in the support member 80, a plate member 69 to support the breather drain hose 61 is arranged. The plate member 69 has an opening to pass through the tubular member 47 and three protrusions 69c formed at three points in the rear and front direction. Such plate member 69 is sandwiched between the overflow tray 70 and the pedestal portion 81 and is fastened together with the fuel cap 60 by utilizing the long bolt 68. The breather drain hose 61 connected with the lower portion of the seal member 64 is supported by a guide portion 69d formed at the left side of the plate member 69 in the vehicle width direction and is piped toward the front left side of the vehicle.

The guide portion 69d has a cross-section curved downward corresponding to the hose with a circular cross-section, thereby the breather drain hose 61 can be stably supported. Further, in the plate member 69, it is formed a folding portion 69a which is parallel with the straight line L connecting two fastening portions 82 existing at two points in the rear side of the vehicle. Based on this downward folding shape, rigidity of the plate member 69 in the area supporting the seal member 64 can be raised; therefore, good sealing property can be obtained.

Referring to FIG. 11, the fuel cap 60 is constituted in a freely openable and closable manner in the rear and front direction of the vehicle by a hinge portion 63. When the fuel cap 60 is closed, a seal 60a is pressed onto the upper end peripheral of the tubular member 47, thereby the filler opening is sealed up. The fuel cap 60 has a key cylinder 65 to open the fuel cap 60 by a key and a lid member 96 which is made freely openable and closable by a hinge portion 66a and protects a key hole from water and the like.

In the fuel cap 60, it is provided a reservoir mechanism utilizing a labyrinth path 67. At the bottom portion of the fuel cap 60 in the partial portion inserted in the tubular member 47, it is attached a one-way valve 66 communicating with the labyrinth path 67. Meanwhile, an exit 67a of the labyrinth path 67 communicates with the breather drain hose 61 through the seal member 64 fixed to the overflow tray 70 side. The seal member 64 formed of rubber and the like is formed into a shape combining an umbrella portion having a through-hole in the center thereof and contacting with the exit 67a and a stepped cylinder portion to support a metallic collar member 65a.

The seal member 64 is supported to the collar member 65a arranged on the bottom of the overflow tray 70. The lower surface of the collar member 65a contacts with the upper surface of a grommet 95 penetrating the bottom of the overflow tray 70. The breather drain hose 61 communicates with the lower portion of the seal member 64. In detail, the collar member 65*a* is formed into a shape extending in the vehicle width direction so as to step over two pedestal portions 81 at the rear side of vehicle and an installation area of the seal member 64 and contacts with the grommet 95 under the seal member 64. Thereby, it can prevent fuel received by the overflow tray 70 from leaking downward from the penetration portion of the breather drain hose 61. The breather drain hose 61 is inserted from below into the penetration hole formed in the grommet 95, thereby the breather drain hose 61 communicates with the seal member 64.

In order to connect the breather drain hose 61 with the grommet 95, it is necessary to curve the end portion of the breather drain hose 61 upward. However, when force to restore an original shape acts on the breather drain hose 61 due to elastic force of a hose material such as rubber and the like, it is conceivable that a piping position of the breather drain hose 61 becomes unstable. On the contrary, in the present embodiment, since the breather drain hose 61 is supported by the guide portion 69*d* of the plate member 69 arranged in the piping direction of the hose, piping position of the hose can be made stable.

The labyrinth path 67 functions as a gas-liquid separation device separating vaporized fuel and liquid fuel. When pressure in the fuel tank 40 raises due to temperature increase and the like, vaporized fuel is passed thorough the labyrinth path 67 through the one-way valve 66, thereby pressure in the fuel tank 40 can be lowered. Further, when much fuel remains, it will be possible that liquid fuel in addition to vaporized fuel enters in the labyrinth path 67. However, gas-liquid separation is conducted in the labyrinth path 67 and liquid fuel returns to the fuel tank 40; thus, only vaporized fuel is discharged from the breather drain hose 61.

In the present embodiment, since the seal member 64 is positioned on the straight line L connecting two fastening portions 82 in the rear side of the vehicle, a position of the breather drain hose 61 can be easily determined in the rear side of the vehicle at the center of the vehicle width direction. Further, in the fuel cap 60 having the hinge portion 63 in the rear side of the vehicle, influence of backlash in the hinge portion 63 can be restrained to the minimum and both the exit 67*a* and the seal member 64 can be precisely contacted by contacting the exit 67*a* of the labyrinth path 67 and seal member 64 at the position near the hinge portion 63 and coupling rigidity of the fuel cap 60 at the position near the hinge portion 63 is raised.

The breather drain hose 61 connected to the lower portion of the seal member 64 and extended downward is supported by the guide portion 69*d* of the plate member 69 at the position overlapping with the support member 80 as seen in a plan view of the vehicle. Thereby, the position of the breather drain hose 61 is restrained at the position near the seal member 64, as a result, tolerance against swing due to vibration can be raised.

Further, as shown in FIG. 9, the protrusion 69*c* of the plate member 69 is protruded more outward of circumference of the overflow tray 70. This protrusion 69*c* functions to restrain the position of a lower extending portion 26*b* extending downward from the opening of the tank cover 26 when the tank cover 26 is attached to the upper portion of the fuel tank 40. Thereby, when the tank cover 26 is assembled, movement of the tank cover 26 in the downward direction is restrained and positioning thereof can be easily done.

According to the above constitution, in the fuel tank 40 of the present embodiment, the breather mechanism discharges vaporized fuel separated by gas-liquid separation in the labyrinth path 67 within the fuel cap 60 from the breather drain hose 61 supported at the fuel tank 40 side. Further, there are provided the plate member 69 fixed to the support member 80 supporting the fuel cap 60 to the fuel tank 40 and the seal member 64 to airtightly communicate the exit 67*a* of the labyrinth path 67 and the end portion of the breather drain hose 61 when the fuel cap 60 is closed. Further, the breather drain hose 61 connected to the lower side of the seal member 64 is supported to the plate member 69. Therefore, since the breather drain hose 61 is supported by the plate member 69, exclusive parts to support the breather drain hose 61 and welding process thereof can be eliminated, as a result, production cost and weight can be restrained.

Here, the shape of the fuel tank and the support member, the structure of the fuel cap and the breather mechanism, the shape of the labyrinth path, the shape and arrangement of the plate member, the structure and arrangement of the seal member, the arrangement position of the breather drain hose and the like are not limited to the above embodiment and various modifications can be done. For example, the hinge portion of the fuel cap may be positioned at the front side of the vehicle and the seal member of the breather drain hose may be arranged at the front side of the vehicle. The fuel tank for the saddled vehicle according to the present invention can be adopted for various vehicles and the like such as three-wheeled vehicle/four wheeled vehicle without being limited to the motorcycle.

REFERENCE SIGNS LIST

1 . . . motorcycle (saddled vehicle),
26 . . . tank cover,
26*b* . . . lower extending portion,
40 . . . fuel tank,
42 . . . upper member,
43 . . . lower member,
60 . . . fuel cap,
61 . . . breather drain hose,
62 . . . overflow drain hose,
63 . . . hinge portion,
64 . . . seal member,
67 . . . labyrinth path,
67*a* . . . exit,
69 . . . plate member,
69*a* . . . folding portion,
69*c* . . . protrusion,
69*d* . . . guide portion,
70 . . . overflow tray,
72 . . . stepped collar,
80 . . . support member,
81 . . . pedestal portion,
81*a* . . . leg portion,
82 . . . fastening portion,
83 . . . base plate

What is claimed is:

1. A fuel tank for a saddled vehicle comprising a fuel cap of an opening and closing type incorporating a breather mechanism, wherein the fuel cap is constituted to close an upper portion of a tubular member constituting a filler opening of the fuel tank, the breather mechanism is constituted to discharge vaporized fuel separated by gas-liquid separation in a labyrinth path within the fuel cap through a breather drain hose supported at a side of the fuel tank, the fuel tank further includes:
a plate member provided on an upper surface of the fuel tank and fixed to a support member to support the fuel cap to the fuel tank; and
a seal member to airtightly communicate an exit of the labyrinth path and an end portion of the breather drain hose when the fuel cap is closed, and
the breather drain hose connected to a lower side of the seal member is supported by the plate member,
wherein the support member is constituted so that at least one pedestal portion is attached on an upper surface of an annular base plate, the pedestal portion having two leg portions formed by folding a plate member into a substantially U-shape, and
the breather drain hose is locked to a guide portion formed in the plate member at a position overlapping with the support member as seen in a plan view of the vehicle.

2. The fuel tank for the saddled vehicle according to claim 1,
wherein the at least one pedestal portion includes three pedestal portions,
the fuel cap is fixed by utilizing a fastening portion formed in each of the pedestal portions, and
the seal member is positioned on a straight line connecting two fastening portions in a plan view of the vehicle.

3. The fuel tank for the saddled vehicle according to claim 1, further comprising:
an overflow tray receiving fuel spilled outside of the tubular member,
wherein the overflow tray is fastened and fixed together with the fuel cap and the support member while being put on an upper surface of the plate member.

4. The fuel tank for the saddled vehicle according to claim 1,
wherein an annular recess portion surrounding the tubular member is formed on an upper surface of the fuel tank, and
the support member is welded and fixed to the annular recess portion.

5. The fuel tank for the saddled vehicle according to claim 1,
wherein the fuel tank is formed by connecting an upper member and a lower member, both being formed by press molding,
the upper member is formed in a solid body shape constituting an upper portion, a side portion and a rear portion of the fuel tank while increasing a size in the front and rear direction as going to a lower direction of the vehicle as seen in the side view of the vehicle, and
the lower member is formed in a shape constituting the front portion and the bottom portion of the fuel tank by curving a flat plate.

6. The fuel tank for the saddled vehicle according to claim 1,
wherein the fuel tank and the support member are formed of a titanium material.

7. The fuel tank for the saddled vehicle according to claim 3, further comprising:
a tank cover covering the fuel tank from an upper surface thereof;
wherein at least a part of the plate member is protruded outward of a circumference of the overflow tray receiving fuel spilled outside of the tubular member and the protruded part restrains movement of the tank cover to a lower direction of the vehicle.

8. The fuel tank for the saddled vehicle according to claim 2,
wherein a folding portion is formed in the plate member, the folding portion being parallel with a straight line connecting two fastening portions and overlapping with the seal member.

9. The fuel tank for the saddled vehicle according to claim 1, further comprising:
an overflow tray receiving fuel spilled outside of the tubular member,
wherein the overflow tray is fastened and fixed together with the fuel cap and the support member while being put on an upper surface of the plate member.

10. The fuel tank for the saddled vehicle according to claim 1,
wherein an annular recess portion surrounding the tubular member is formed on an upper surface of the fuel tank, and
the support member is welded and fixed to the annular recess portion.

11. The fuel tank for the saddled vehicle according to claim 1,
wherein the fuel tank is formed by connecting an upper member and a lower member, both being formed by press molding,
the upper member is formed in a solid body shape constituting an upper portion, a side portion and a rear portion of the fuel tank while increasing a size in the front and rear direction as going to a lower direction of the vehicle as seen in the side view of the vehicle, and
the lower member is formed in a shape constituting the front portion and the bottom portion of the fuel tank by curving a flat plate.

12. The fuel tank for the saddled vehicle according to claim 1,
wherein the fuel tank and the support member are formed of a titanium material.

13. The fuel tank for the saddled vehicle according to claim 1, further comprising:
a tank cover covering the fuel tank from an upper surface thereof;
wherein at least a part of the plate member is protruded outward of a circumference of the overflow tray receiving fuel spilled outside of the tubular member and the protruded part restrains movement of the tank cover to a lower direction of the vehicle.

* * * * *